(12) United States Patent
Taniguchi

(10) Patent No.: US 11,661,062 B2
(45) Date of Patent: May 30, 2023

(54) DRIVING ASSIST METHOD AND DRIVING ASSIST DEVICE

(71) Applicant: Nissan Motor Co., Ltd., Yokohama (JP)

(72) Inventor: Yohei Taniguchi, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 429 days.

(21) Appl. No.: 15/734,304

(22) PCT Filed: Jun. 28, 2018

(86) PCT No.: PCT/JP2018/024653
§ 371 (c)(1),
(2) Date: Dec. 2, 2020

(87) PCT Pub. No.: WO2020/003452
PCT Pub. Date: Jan. 2, 2020

(65) Prior Publication Data
US 2021/0155243 A1    May 27, 2021

(51) Int. Cl.
*B60W 10/20*    (2006.01)
*B60W 30/18*    (2012.01)
(Continued)

(52) U.S. Cl.
CPC ...... *B60W 30/18163* (2013.01); *B60W 10/20* (2013.01); *B60W 40/04* (2013.01); *B60W 2554/4041* (2020.02); *B60W 2556/50* (2020.02)

(58) Field of Classification Search
CPC .......... B60W 30/18163; B60W 10/20; B60W 40/04; B60W 2554/4041; B60W 2556/50;
(Continued)

(56) References Cited

U.S. PATENT DOCUMENTS

2017/0355368 A1* 12/2017 O'Dea .................. B60W 30/16
2018/0037233 A1*  2/2018 Fendt ................... G05D 1/0214
(Continued)

FOREIGN PATENT DOCUMENTS

| JP | 2017-83446 A | 5/2017 |
|---|---|---|
| JP | 2017-142223 A | 8/2017 |
| WO | 2016/063383 A1 | 4/2016 |

*Primary Examiner* — Abby Y Lin
*Assistant Examiner* — Hossam M Abd El Latif
(74) *Attorney, Agent, or Firm* — Global IP Counselors, LLP

(57) ABSTRACT

A driving assist method executes a lane change assist based on a generated target travel route. Upon determining the host vehicle is traveling in a road having several lanes, an determination is made as to whether or not the host vehicle is traveling in a first area where an autonomous lane change can be executed. Next, upon determining that the host vehicle is traveling in the first area, an determination is made as to whether or not the host vehicle is traveling in a predetermined range from an area border, which is a boundary between the first area and a second area where the autonomous lane change cannot be executed. Upon determining the host vehicle is traveling in a predetermined range from the area border, a control for the autonomous lane change is performed so that the host vehicle travels in a traveling lane.

7 Claims, 5 Drawing Sheets

(51) Int. Cl.
*B60W 40/04* (2006.01)
*B60W 60/00* (2020.01)
*G08G 1/16* (2006.01)

(58) Field of Classification Search
CPC ......... B60W 2556/40; B60W 2552/10; B60W 30/10; B60W 30/12; B60W 60/00; B60W 60/001; B60W 60/0011; B60W 60/005; B60W 60/0051; B60W 60/0053; B60W 60/0054; B60W 60/0055; B60W 60/0057; B60W 60/0059; B60W 60/0061; B60W 60/007; G08G 1/167; G08G 1/0962; G05D 1/0289; G05D 2201/0213; G06V 20/588; G09B 29/10
USPC .......................................................... 701/41
See application file for complete search history.

(56) References Cited

U.S. PATENT DOCUMENTS

2018/0046191 A1\* 2/2018 Keller ............... B60W 50/0098
2019/0212749 A1\* 7/2019 Chen ..................... G06N 20/00

\* cited by examiner

DRIVING ASSIST METHOD AND DRIVING ASSIST DEVICE

CROSS-REFERENCE TO RELATED APPLICATIONS

This application is a U.S. national stage application of International Application No. PCT/JP2018/024653, filed on Jun. 28, 2018.

TECHNICAL FIELD

The present disclosure relates to a driving assist method and a driving assist device.

BACKGROUND INFORMATION

In the prior art, there have been driving assist methods in which a route from a current position of a host vehicle to a destination is divided into a plurality of block areas, and among pieces of detailed information on the route corresponding to the individual block areas, detailed information needed for current autonomous control is outputted in block area units (for example refer to Japanese Laid-Open Patent Application No. 2017-83446—Patent Document 1).

SUMMARY

With a vehicle that makes an autonomous lane change on the basis of high-precision map information and other detailed information, control for the host vehicle must be considered when traveling across an area border between an area where the high-precision map information is maintained and an autonomous lane change can be executed, and an area where the high-precision map information is not maintained and an autonomous lane change cannot be executed. Specifically, control specifics of an autonomous lane change will switch due to crossing the area border. Therefore, particularly when traveling in a passing lane, it is possible for travel in the passing lane to continue for longer than anticipated.

The present disclosure was contrived in view of the problems described above, it being an object of the present disclosure to provide a driving assist method and a driving assist device with which travel in a passing lane can be prevented from continuing for longer than anticipated.

To achieve the object described above, the present disclosure is a driving assist method carried out by a controller that generates a target travel route and executes a lane change assist in which a lane change made by a host vehicle is assisted on the basis of the target travel route.

In this driving assist method, an area where an autonomous lane change can be executed is designated as a first area, an area where an autonomous lane change cannot be executed is designated as a second area, and a boundary between the first area and the second area is designated as an area border.

In this driving assist method, determining whether or not the host vehicle is traveling in a road which has a plurality of lanes and in which a lane change can be made, and upon determining that the host vehicle is traveling in such a road, determining whether or not the host vehicle is traveling in the first area. Upon determining that the host vehicle is traveling in the first area, determining whether or not the host vehicle is traveling in a predetermined range from the area border.

Upon determining that the host vehicle is traveling in a predetermined range from the area border, control for the lane change assist is performed so that the host vehicle travels in a non-passing lane.

Consequently, according to the present disclosure, travel in a passing lane can be prevented from continuing for longer than anticipated.

BRIEF DESCRIPTION OF THE DRAWINGS

Referring now to the attached drawings which form a part of this original disclosure.

DETAILED DESCRIPTION OF EMBODIMENTS

Figure 1:
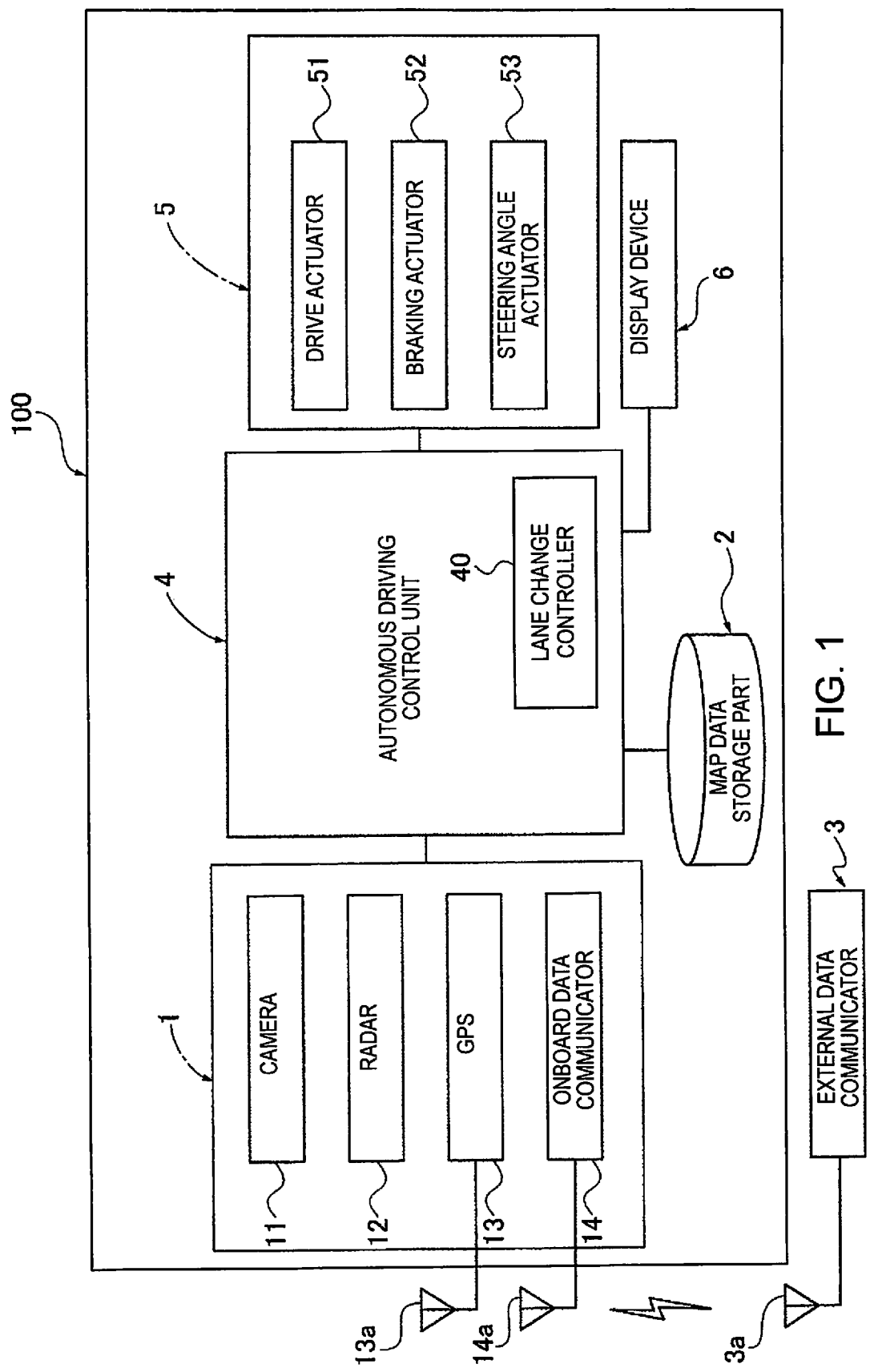
FIG. 1 is an overall system diagram of an autonomous driving control system to which a driving assist method and a driving assist device of having been applied to a first embodiment.

An embodiment of a driving assist method and a driving assist device according to the present disclosure is described below on the basis of a first embodiment shown in the drawings.

First Embodiment

The driving assist method and the driving assist device in the first embodiment are applied to an autonomously driven vehicle (one example of a drive-assisted vehicle; a host vehicle) in which when an autonomous driving mode is selected, driving, braking, and steering are autonomously controlled so that the vehicle travels along a generated target travel route. A description of a configuration of the first embodiment is divided below into sections "Overall System Configuration," "Control Block Configuration of Lane Change Controller," and "Process Configuration of Lane Change Assistance Control."

Overall System Configuration

An autonomous driving system 100 is provided with an onboard sensor 1, a map data storage part 2, an external data communicator 3, an autonomous driving control unit 4, an actuator 5, and a display device 6, as shown in FIG. 1.

The onboard sensor 1 has a camera 11, a radar 12, a GPS 13, and an onboard data communicator 14. Though not shown, a vehicle speed sensor, an accelerator position sensor, a brake sensor, a steering angle sensor, and other sensors that detect host vehicle information are included in the onboard sensor 1. Sensor information acquired by the onboard sensor 1 is outputted to the autonomous driving control unit 4.

The camera 11 is a surroundings recognition sensor that carries out a function of acquiring host vehicle surroundings information such as lanes, preceding vehicles, and pedestrians from image data, as a function needed for autonomous driving. The camera 11 is configured by combining, for example, a host vehicle forward recognition camera, a rearward recognition camera, a rightward recognition camera, a leftward recognition camera, etc.

Objects on the host vehicle travel roadway, lanes, objects outside of the host vehicle travel roadway (road structures, preceding vehicles, succeeding vehicles, oncoming vehicles, surrounding vehicles, pedestrians, bicycles, motorcycles), the host vehicle travel roadway (white road lines, road borders, stop lines, crosswalks), road signs (speed limits), etc., are sensed by the camera 11.

The radar 12 is a distance measurement sensor that carries out a function of sensing the presence of objects in the surroundings of the host vehicle and the function of sensing distances to objects in the surroundings of the host vehicle, as functions needed for autonomous driving. "Radar 12" in this example is a general term including radar using radio waves, lidar using light, and sonar using ultrasonic waves.

For example, laser radar, milliwave radar, ultrasonic radar, a laser range finder, etc., can be used as the radar 12. The radar 12 is configured by combining, for example, host vehicle forward radar, rearward radar, rightward radar, leftward radar, etc.

Positions of objects on the host vehicle travel roadway, objects outside of the host vehicle travel roadway (road structures, preceding vehicles, succeeding vehicles, oncoming vehicles, surrounding vehicles, pedestrians, bicycles, motorcycles), etc., are sensed and distances to the objects are sensed by the radar 12. If a viewing angle is insufficient, viewing angle may be added as appropriate.

The GPS 13 is a host vehicle position sensor that has a GNSS antenna 13*a* and uses satellite communication to sense the host vehicle position (latitude and longitude) while the host vehicle is stopped or traveling. "GNSS" is an abbreviation of "Global Navigation Satellite System," and "GPS" is an abbreviation of "Global Positioning System."

The onboard data communicator 14 is an external data sensor that wirelessly communicates with the external data communicator 3 via transceiver antennas 3*a*, 14*a*, and thereby acquires information that cannot be acquired from the host vehicle.

In cases where the external data communicator 3 is, for example, a data communicator mounted in another vehicle traveling in the vicinity of the host vehicle, vehicle-to-vehicle communication is performed between the host vehicle and the other vehicle. Information necessary to the host vehicle can be acquired, by request from the onboard data communicator 14, from among a variety of information retained in the other vehicle, the acquisition being made via the vehicle-to-vehicle communication. In cases where the external data communicator 3 is, for example, a data communicator provided to infrastructure equipment, vehicle-to-infrastructure communication is performed between the host vehicle and the infrastructure equipment. Information necessary to the host vehicle can be acquired, by request from the onboard data communicator 14, from among a variety of information retained in the infrastructure equipment, the acquisition being made via the vehicle-to-infrastructure communication.

Specifically, in cases where the acquired information has, e.g., information that map data saved in the map data storage part 2 lacks, or information changed from that in the map data, it is possible for the lacking information/changed information to be supplementarily provided through communication between the external data communicator 3 and external equipment. In addition, it is possible to acquire traffic information, such as congestion information or travel restriction information, pertaining to a target travel route on which the host vehicle is planned to travel.

The map data storage unit 2 is configured from an onboard memory that contains "electronic map data," in which map information and latitude/longitude are associated. When the host vehicle position detected by the GPS 13 is recognized, the map data storage part 2 transmits electronic map data centered around the host vehicle position to the autonomous driving control unit 4.

The electronic map data has road information associated with individual locations, the road information being defined by nodes and links that connect the nodes. The road information includes: information that specifies the road according to the position/area of the road; and information pertaining to road identification for each road, a road width for each road, and a road shape. The road information is stored, for each item of identification information pertaining to the road links, in association with other information relating to intersections, such as the position of an intersection, an entry direction of the intersection, and a classification of the intersection. Additionally, the road information is stored, for each item of identification information pertaining to the road links, in association with other information relating to roads, such as road classification, road width, road shape, whether or not it is possible to advance straight, relationship of advancing priority, whether or not it is possible to pass (whether or not it is possible to enter an adjacent lane), speed limit, and road signs.

The electronic map data includes GPS map data and high-precision three-dimensional map data (a dynamic map). The GPS map data is map data used in normal route guidance, and is maintained in nearly all areas where the vehicle can travel. The high-precision three-dimensional map data is map data retaining three-dimensional space information in higher definition than the GPS map data, and retaining a level of precision such that individual lanes can be recognized in a road having at least a plurality of lanes. The high-precision three-dimensional map data is used in the execution of autonomous lane changes. By using the high-precision three-dimensional map data, it is possible to set a target travel route, by which it is decided which of a plurality of lanes the host vehicle will travel in under autonomous driving. However, the high-precision three-dimensional map data is limited to areas where data is maintained, as in the case of, for example, specific national expressways, motorways, etc.

An area which retains the high-precision three-dimensional map data and in which an autonomous lane change can be executed is referred to below as a "first area." An area which does not retain the high-precision three-dimensional map data and in which an autonomous lane change cannot be executed is referred to as a "second area." Furthermore, a boundary between a "first area" and a "second area" is referred to as an "area border."

The term "autonomous lane change" means an autonomous changing of the lane in which the host vehicle is traveling due to a predetermined lane change condition being satisfied, the autonomous lane change being executed on the basis of host vehicle position information and lane information and not requiring the intervention of driver operation. In other words, the term "a first area where an autonomous lane change can be executed" refers to an area where it is possible to acquire both host vehicle position information and lane information needed in the execution of an autonomous lane change. An area where high-precision three-dimensional map data is maintained is an area where lane information can be acquired. The term "a second area where an autonomous lane change cannot be executed" refers to an area where it is not possible to acquire at least one of the host vehicle position information and the lane information needed in the execution of an autonomous lane change. An area where high-precision three-dimensional map data is not maintained is an area where lane information cannot be acquired. Areas inside tunnels, areas underground, etc., where the host vehicle position information detected by the GPS 13 cannot be acquired are also "second areas."

The autonomous driving control unit 4 collectively processes input information (host vehicle information, host vehicle position information, host vehicle surroundings information, map data information, destination information, etc.) from the onboard sensor 1 and the map data storage part 2, and generates a target travel route. Driving assist control, which assists the driving of the host vehicle, is performed on the basis of the target travel route. Specifically, the autonomous driving control unit 4 generates a target travel route from a current location to a destination on the basis of road information from the map data storage part 2, a search technique, etc. A drive command value, braking command value, and steering angle command value are then computed so that the host vehicle will travel along the generated target travel route, the computed command values are outputted to individual actuators, and the host vehicle is caused to travel/stop along the target travel route. Specifically, a result from computing of the drive command value is outputted to a drive actuator 51, a result from computing of the braking command value is outputted to a braking actuator 52, and a result from computing of the steering command value is outputted to a steering actuator 53. At this time, when an autonomous lane change request is outputted in accordance with the travel status, an autonomous lane change is executed in accordance with to the request.

Furthermore, the autonomous driving control unit 4 is provided with a lane change controller 40 (a controller) that performs control for an autonomous lane change (a lane change assist) so that within the first area, the host vehicle will travel in a traveling lane (a non-passing lane) when the host vehicle is traveling in a predetermined range from an area border. Specifically, by controlling the autonomous lane change, the lane change controller 40 causes the host vehicle to travel in the traveling lane in a predetermined range from the area border while the host vehicle is traveling in the first area.

A "passing lane" is a lane for passing a vehicle traveling ahead of the host vehicle, and in this embodiment is a rightmost lane in the case of a plurality of lanes. A "traveling lane (non-passing lane)" is a lane used during normal travel and is a lane other than the passing lane. In this embodiment, the traveling lane is a lane other than the rightmost lane in the case of a plurality of lanes.

The actuator 5 is a control actuator for causing the host vehicle to travel/stop along the target travel route. The actuator 5 has the drive actuator 51, the braking actuator 52, and the steering actuator 53.

The drive actuator 51 is an actuator that receives input of a drive command value from the autonomous driving control unit 4 and controls a drive force outputted to drive wheels. As the drive actuator 51, for example, an engine is used in the case of an engine vehicle, an engine and a motor-generator (force travel) are used in the case of a hybrid vehicle, and a motor-generator (force travel) is used in the case of an electric automobile.

The braking actuator 52 is an actuator that receives input of a braking command value from the autonomous driving control unit 4 and controls braking force outputted to the drive wheels. For example, a hydraulic booster, an electric booster, a brake fluid pressure actuator, a brake motor actuator, a motor-generator (regenerative), etc., is used as the braking actuator 52.

The steering angle actuator 53 is an actuator that receives input of a steering angle command value from the autonomous driving control part 4 and controls the steering angle of steered wheels. A turning motor, etc., provided to a steering force transmission system of a steering system is used as the steering angle actuator 53.

The display device 6 is a device that displays a screen image pertaining to, inter alia, where on a map the host vehicle is moving during stopping/traveling caused by the autonomous driving, and provides visual information pertaining to the host vehicle position to a driver and/or a passenger. The display device 6 receives input of the target travel route information, the host vehicle position information, the destination information, etc., generated by the autonomous driving control unit 4, and displays a map, a road, the target travel route (travel route of the host vehicle), the host vehicle position, the destination, etc., on a display screen image in a readily visible manner.

<Control Block Configuration of Lane Change Controller>

Figure 2:
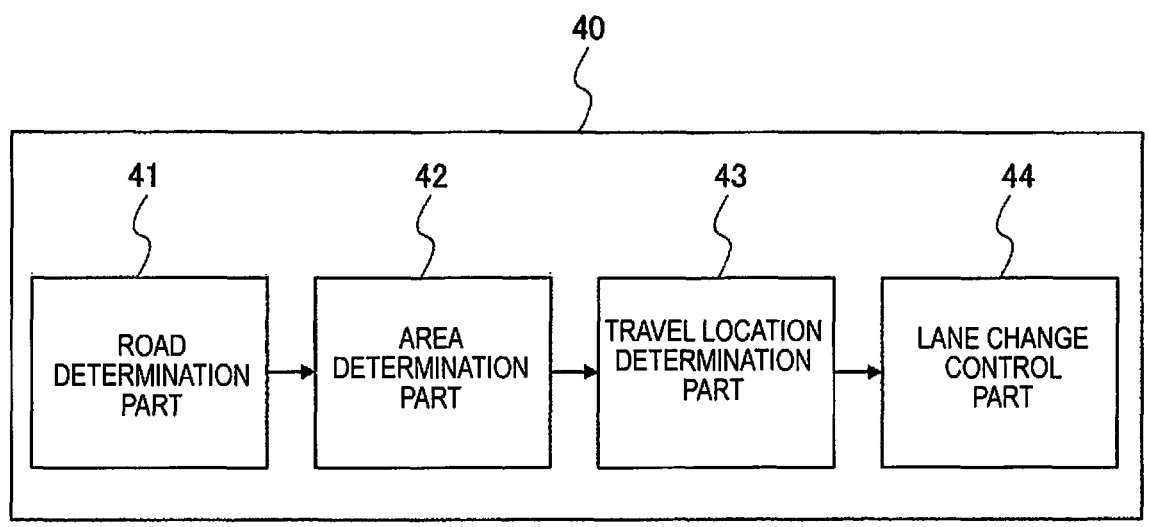
FIG. 2 is a control block diagram of a lane change controller provided to an autonomous driving control unit of the first embodiment.

The lane change controller 40 is provided with a road determination part 41, an area determination part 42, a travel location determination part 43, and a lane change control part 44, as shown in FIG. 2

The road determination part 41 receives input of host vehicle information map data information, etc. In the road determination part 41, on the basis of the various inputted information, an determination is made as to whether or not the road on which the host vehicle is currently traveling is a road which has a plurality of lanes and in which a lane change can be executed, and road classification information is outputted. The outputted road classification information is inputted to the area determination part 42. A classification of the road traveled on by the host vehicle is assessed by checking the host vehicle position information and the map data information. This determination can be made on the basis of host vehicle surroundings information acquired from the camera 11, etc.

The area determination part 42 receives input of a determination result (road classification information) from the road determination part 41, the host vehicle position information, the map data information, etc. In the area determination part 42, when an determination result indicating that the road traveled on by the host vehicle is a multi-lane road having a plurality of lanes is inputted from the road determination part 41, an determination is made as to whether or not the host vehicle is traveling in the first area on the basis of the various inputted information, and area information is outputted. The outputted area information is inputted to the travel location determination part 43. Whether or not the host vehicle is traveling in the first area, i.e., the travel area of the host vehicle is assessed by checking the host vehicle position information and the map data information.

The travel location determination part 43 receives input of a determination result (area information) from the area determination part 42, the host vehicle position information, the map data information, etc. In the travel location determination part 43, when an determination result indicating that the area traveled in by the host vehicle is the first area where an autonomous lane change can be executed is inputted from the area determination part 42, an determination is made, on the basis of the various inputted information, as to whether or not the host vehicle is traveling in a predetermined range from the area border on the basis of the position where the host vehicle is traveling, and travel location information is outputted. The outputted travel location information is inputted to the lane change control part 44. The travel position of the host vehicle is assessed by checking the host vehicle position information and the map data information.

The lane change control part 44 receives input of a determination result (travel location information) from the travel location determination part 43, the host vehicle position information, the map data information, the host vehicle surroundings information, etc. In the lane change control part 44, when an determination result indicating that the host vehicle is traveling within a predetermined range from a border area is inputted from the travel location determination part 43, output of an autonomous lane change request is controlled on the basis of the various inputted information so that the host vehicle will travel in the traveling lane (the non-passing lane). Specific examples are given below.

When a distance from the host vehicle to the area border immediately ahead of the host vehicle is equal to or less than a first threshold value distance, provided that the host vehicle is traveling in a passing lane, a request for an autonomous lane change to the traveling lane is outputted.

When the host vehicle has not executed a lane change within the first area and a time from a timepoint when the host vehicle last performed a lane change to a current timepoint is equal to or greater than a second threshold value time, provided that the host vehicle is traveling in the passing lane, a request for an autonomous lane change to the traveling lane is outputted.

When the distance from the host vehicle to the area border immediately ahead of the host vehicle is equal to or less than a third threshold value distance, provided that the host vehicle is traveling in the traveling lane, an autonomous lane change to the passing lane is prohibited.

When the distance from the host vehicle to the area border immediately ahead of the host vehicle is equal to or less than the first threshold value distance, provided that the host vehicle is traveling in the traveling lane, an autonomous lane change to the passing lane is prohibited.

When the time from the timepoint when the host vehicle last performed a lane change to the current timepoint is less than the second threshold value time even though the host vehicle has not executed a lane change within the first area, output of an autonomous lane change request corresponding to the travel status is enabled. In this situation, an autonomous lane change request corresponding to the travel status is, for example, a request to travel along the target travel route or a request to pass a preceding vehicle.

When the host vehicle has not executed a lane change within the first area and even though the time from the timepoint when the host vehicle last performed a lane change to the current timepoint is equal to or greater than the second threshold value time, provided that the host vehicle is traveling in the traveling lane, output of an autonomous lane change request corresponding to the travel status is enabled.

The classification of the lane traveled in by the host vehicle (traveling lane or passing lane) is assessed by checking the host vehicle position information and the map data information. This determination can be made on the basis of host vehicle surroundings information acquired from the camera 11, etc.

Process Configuration of Lane Change Assistance Control

Figure 3:
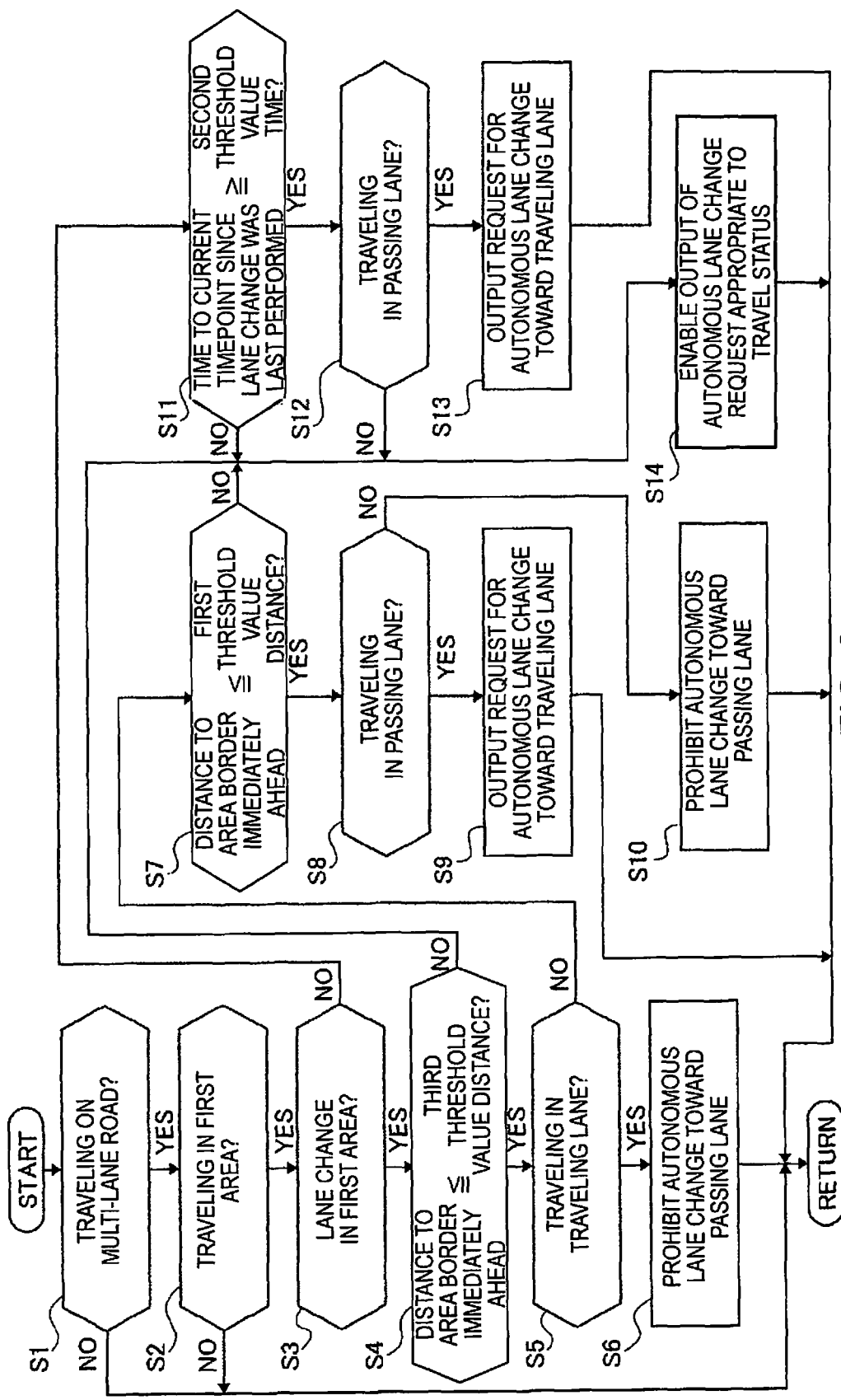
FIG. 3 is a flowchart of a flow of a lane change assist control executed by the lane change controller of the first embodiment.

FIG. 3 is a flowchart of a flow of a lane change assist control. Steps of FIG. 3 are described below.

In step S1, and determination is made as to whether or not the host vehicle is traveling on a multi-lane road having a plurality of lanes. When the determination is YES (traveling in a multi-lane road), the process advances to S2 on the assumption that a lane change is possible. When the determination is NO, the process advances to RETURN on the assumption that a lane change cannot be executed. Step S1 corresponds to the road determination part 41.

In step S2, in continuation from the determination in step S1 that the host vehicle is traveling on a multi-lane road, and determination is made as to whether or not the host vehicle is traveling in the first area. When the determination is YES (traveling in the first area), the process advances to S3. When the determination is NO (traveling in the second area), the process advances to RETURN on the assumption that an autonomous lane change cannot be controlled. Step S2 corresponds to the area determination part 42. In this embodiment, a "first area" is an area where high-precision three-dimensional map data is maintained, and an autonomous lane change can be executed. Additionally, a "second area" is an area where high-precision three-dimensional map data is not maintained, and an autonomous lane change cannot be executed. Furthermore, the area where the host vehicle is traveling is assessed by checking the host vehicle position information and the map data information.

In step S3, in continuation from the determination in step S2 that the host vehicle is traveling in the first area, an determination is made as to whether or not a lane change has been executed in the first area, i.e., whether or not a lane change has been performed since the host vehicle had begun to travel in the first area. When the determination is YES (lane change), the process advances to S4 on the assumption that the lane currently being traveled in is different from the lane the host vehicle had been traveling in when moving from the second area to the first area. When the determination is NO (no lane change), the process advances to S11 on the assumption that the lane currently being traveled in is the same as the lane the host vehicle had been traveling in when moving from the second area to the first area.

In step S4, in continuation from the determination in step S3 that there has been a lane change in the first area, an determination is made as to whether or not a distance from the host vehicle to the area border (the area border immediately ahead) present in a position nearest to the host vehicle among area borders present ahead of the host vehicle (a first position index value) is equal to or less than a third threshold value distance (a third threshold value) that has been set in advance. When the determination is YES (distance to area border immediately ahead≤third threshold value distance), the process advances to S5. When the determination is NO (distance to area border immediately ahead>third threshold value distance), the process advances to S14. Step S4 corresponds to the travel location determination part 43. An "area border" is a boundary between the first area and the second area. The third threshold value is a distance at which it is assessed that performing two or more autonomous lane changes would be difficult; for example, this value is set to 3 km.

In step S5, in continuation from the determination in step S4 that the distance to the area border immediately ahead is equal to or less than the third threshold value distance, a determination is made as to whether or not the host vehicle is traveling in the traveling lane (the non-passing lane). When the determination is YES (traveling in the traveling lane), the process advances to S6. When the determination is NO (traveling in the passing lane), the process advances to S7. The lane the host vehicle is traveling in is assessed by checking the host vehicle position information and the map data information.

In step S6, in continuation from the determination in step S5 that the host vehicle is traveling in the traveling lane, a control signal prohibiting an autonomous lane change toward the passing lane is outputted, and the process advances to RETURN. As a result, a request for an autonomous lane change toward the passing lane is not outputted, and travel in the traveling lane is maintained. An autonomous lane change between traveling lanes is not prohibited, and, for example, an autonomous lane change from a center lane to a left-end lane is therefore possible. Step S5 and step S6 correspond to the lane change control part 44.

In step S7, in continuation from the determination in step S5 that the host vehicle is traveling in the passing lane, an determination is made as to whether or not the distance from the host vehicle to the area border immediately ahead of the host vehicle (the first position index value) is equal to or less than the first threshold value distance (a first threshold value), which has been set in advance. When the determination is YES (distance to area border immediately ahead≤first threshold value distance), the process advances to S8. When the determination is NO (distance to area border immediately ahead>first threshold value distance), the process advances to S14. Step S7 corresponds to the travel location determination part 43. The first threshold value distance is a distance at which it is assessed that it would be difficult to perform a lane change due to the driver's operation after an autonomous lane change has been executed; for example, this distance is set to 2 km.

In step S8, in continuation from the determination in step S7 that the distance to the area border immediately ahead is equal to or less than the first threshold value distance, a determination is made as to whether or not the host vehicle is traveling in the passing lane. When the determination is YES (traveling in passing lane), the process advances to S9. When the determination is NO (traveling in traveling lane), the process advances to S10. The lane the host vehicle is traveling in is assessed by checking the host vehicle position information and the map data information, as in step S5.

In step S9, in continuation from the determination in step S8 that the host vehicle is traveling in the passing lane, a request for an autonomous lane change toward the traveling lane (the non-passing lane) is outputted, and the process advances to RETURN. As a result, a determination is made as to whether or not it is possible to execute an autonomous lane change to the traveling lane, and upon determining that it is possible to execute an autonomous lane change, an autonomous lane change toward the traveling lane is executed.

In step S10, in continuation from the determination in step S8 that the host vehicle is traveling in the traveling lane, a control signal prohibiting an autonomous lane change toward the passing lane is outputted, and the process advances to RETURN. As a result, a request for an autonomous lane change toward the passing lane is not outputted, and travel in the traveling lane is maintained. An autonomous lane change between traveling lanes is not prohibited, and, for example, an autonomous lane change from a center lane to a left-end lane in a three-lane road is therefore possible. Step S8 to step S10 correspond to the lane change control part 44.

In step S11, in continuation from the determination in step S3 that there has not been a lane change in the first area, an determination is made as to whether or not the time from the timepoint when a lane change was last performed to the current timepoint (a second position index value) is equal to or greater than the second threshold value time (a second threshold value), which has been set in advance. When the determination is YES (time to current timepoint since lane change was last performed≥second threshold value time), the process advances to S12 on the assumption that travel in the passing lane has continued for at least a stipulation. When the determination is NO (time to current timepoint since lane change was last performed<second threshold value time), the process advances to S14 on the assumption that the continuous travel in the passing lane is below the stipulation. Step S11 corresponds to the travel location determination part 43. The "last lane change" is a lane change executed in the past, nearest to the current timepoint. It is irrelevant whether this lane change is a lane change that was performed due to the driver's operation or an autonomous lane change. Additionally, whether or not the host vehicle performed a lane change can be ascertained from, for example, white line information detected by the camera 11, steering angle information detected by the steering angle sensor, etc. In other words, even in the second area in which an autonomous lane change cannot be executed, the execution of a lane change can be ascertained.

In step S12, in continuation from the determination in step S11 that the time from the timepoint when a lane change was last performed to the current timepoint is equal to or greater than the second threshold value time, an determination is made as to whether or not the host vehicle is traveling in the passing lane. When the determination is YES (traveling in passing lane), the process advances to S13. When the determination is NO (traveling in traveling lane), the process advances to S14. The lane the host vehicle is traveling in is assessed by checking the host vehicle position information and the map data information, as in step S5 and step S8.

In step S13, in continuation from the determination in step S12 that the host vehicle is traveling in the passing lane, a request for an autonomous lane change toward the traveling lane (the non-passing lane) is outputted, and the process advances to RETURN. As a result, a determination is made as to whether or not it is possible to execute an autonomous lane change to the traveling lane, and upon determining that it is possible to execute an autonomous lane change, an autonomous lane change toward the traveling lane is executed.

In step S14, in continuation from either the determination in step S4 that the distance to the area border immediately ahead is greater than the third threshold value distance, the determination in step S7 that the distance to the area border immediately ahead is greater than the first threshold value distance, the determination in step S11 that the time since a lane change was last performed to the current timepoint is less than the second threshold value time, or the determination in step S12 that the host vehicle is traveling in the traveling lane, an appropriate autonomous lane change request corresponding to the travel status is outputted and the process advances to RETURN. As a result, a determination is made as to whether or not it is possible to execute an autonomous lane change based on the autonomous lane change request outputted as necessary, and an autonomous lane change is executed upon determining that it is possible to execute an autonomous lane change. Step S12 to step S14 correspond to the lane change control part 44.

Next, the section "Objectives for Executing Autonomous Lane Change" shall be described, and the actions of the driving assist method and driving assist device of the first embodiment shall then be divided into the sections "Control Action Before Lane Change Execution in First Area" and "Control Action After Lane Change Execution in First Area."

Objectives for Executing Autonomous Lane Change

Host vehicle position information and lane information are needed for an autonomous lane change, in which the lane the host vehicle is traveling in is autonomously changed due to a predetermined lane change condition being satisfied, to be executed without requiring the intervention of driver operation. Specifically, a lane set in the road and a host vehicle travel position relative to the lane need to be accurately ascertained.

The lane information can be acquired from high-precision three-dimensional map data. However, high-precision three-dimensional map data is not limited to being maintained on all routes the host vehicle travels in. An autonomous lane change could also be allowed on the premise that high-precision map data is maintained. Inasmuch, an area in which high-precision three-dimensional map data is maintained is an area where an autonomous lane change can be executed (the first area), and an area where high-precision three-dimensional map data is not maintained is an area where an autonomous lane change cannot be executed (the second area).

When the host vehicle travels across the area border from the first area to the second area and is traveling in the passing lane before entering the second area, an autonomous lane change cannot be controlled in the second area, and it is therefore a possibility that travel in the passing lane could continue. As a result, a possibility arises that the host vehicle could continuously travel in the passing lane for longer than anticipated.

When the host vehicle travels across the area border from the second area to the first area and control is performed so that a lane change is made when a normal autonomous lane change condition is fulfilled, there is a possibility that travel in the passing lane could be continued. In other words, when the host vehicle had been traveling in the passing lane in the second area where execution of an autonomous lane change is not possible, there is a possibility that the travel time or travel distance in the passing lane will have already been longer than anticipated at the timepoint of entry into the first area. Therefore, when an determination is made as to whether or not travel in the passing lane can continue for a travel time (or travel distance) following the timepoint of entry into the first area, travel in the passing lane will have continued for longer than anticipated when totaled with the time (or distance) of traveling in the passing lane in the second area.

Thus, when the host vehicle travels across the area border between the first area and the second area, there is a possibility that travel in the passing lane will continue for longer than anticipated.

Control Action Before Lane Change Execution in First Area

Figure 4:
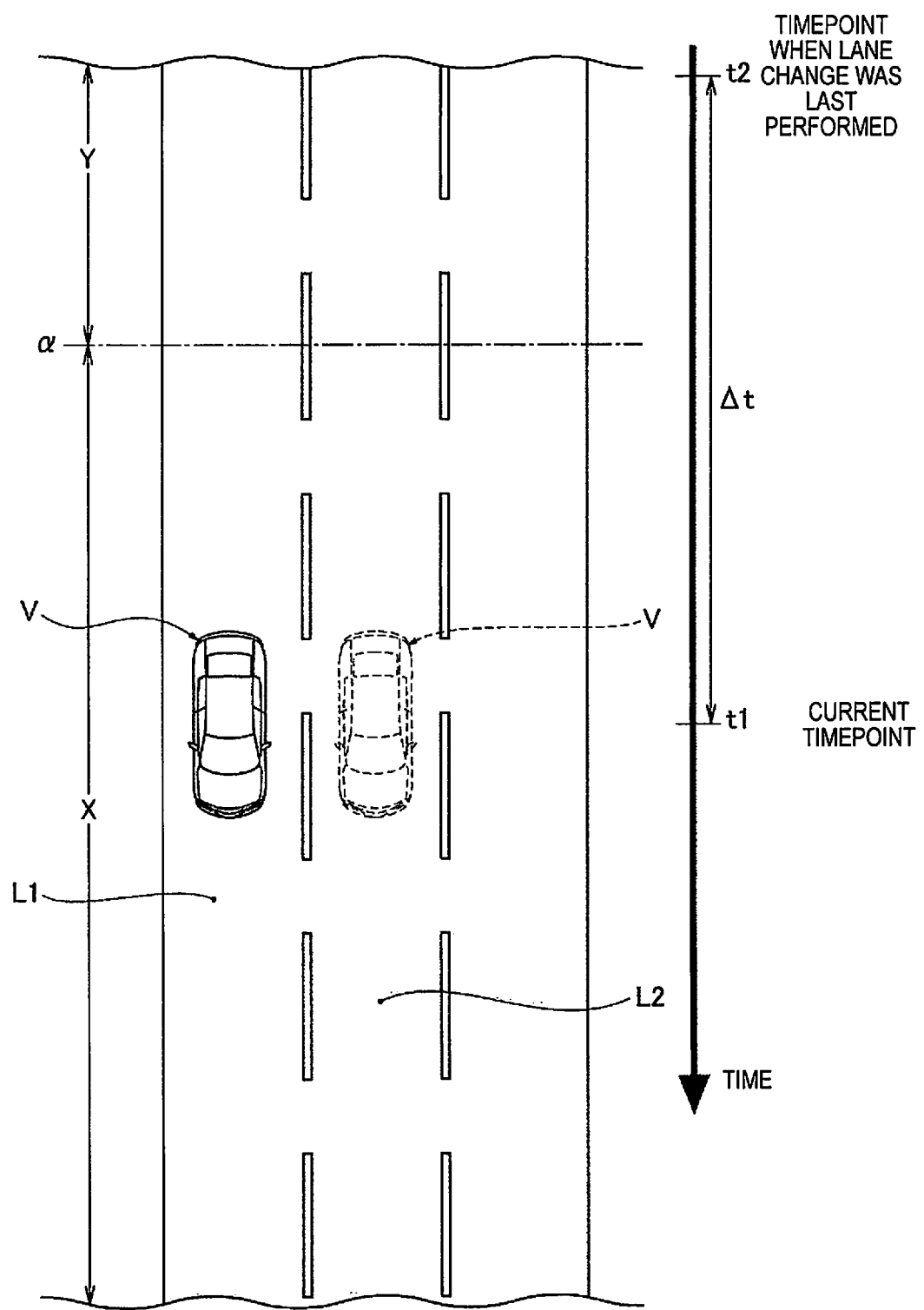
FIG. 4 is an explanatory drawing of a travel state when crossing an area border from a second area and entering a first area.

A situation is considered in which a host vehicle V has traveled across the area border α from a second area Y toward a first area X and has entered the first area X, as shown in FIG. 4. At this time, in the first area X and the second area Y, the road has three lanes, in each of which changing lanes is possible. It is also assumed that neither a lane change due to the driver's operation nor an autonomous lane change has been executed since traveling in the first area X.

Therefore, in the flowchart shown in FIG. 3, the process advances in the order of step S1, step S2, step S3, and step S11, and an determination is made as to whether or not a time Δt from a timepoint t2 when a lane change was last performed to a current timepoint t1 is equal to or greater than a second threshold value time, which has been set in advance.

In the scenario shown in FIG. 4, it is assumed that the time Δt is equal to or greater than the second threshold value time. In other words, it is assumed that the host vehicle V has been continuously traveling in the current lane for at least the second threshold value time.

Therefore, the process advances to S12, and a determination is made as to whether or not the host vehicle V is traveling in a passing lane L1. In the scenario shown in FIG. 4, the host vehicle V is traveling in the passing lane L1. Specifically, it can be assessed that the host vehicle V has been continuously traveling for at least the second threshold value time at the current timepoint. Due to this determination, the process advances to S13 and a request for an autonomous lane change toward the traveling lane (the non-passing lane) L2 is outputted. Upon determining that an autonomous lane change can be executed, a target travel roadway is set to the traveling lane L2, and an autonomous lane change toward the traveling lane L2 is executed.

Thus, when the status in the first area X is such that it can be assessed that the host vehicle V has been traveling in the passing lane L1 for at least the second threshold value time, a request for an autonomous lane change toward the traveling lane L2 is outputted. Due to this request output, the host vehicle V can quickly move into the traveling lane and travel in the passing lane L1 can be prevented from continuing. Consequently, travel in the passing lane L1 can be prevented from continuing for longer than anticipated.

At the timepoint at which the process advances to step S11, when the time Δt from the timepoint t2 when a lane change was last performed to the current timepoint t1 is less than the second threshold value time, it is assumed that the host vehicle V has not continued to travel in the current lane for at least the second threshold value time. Therefore, even if the host vehicle V has been traveling in the passing lane L1 as shown in, for example, FIG. 4, it can be assessed that the travel time in the passing lane L1 is less than the second threshold value time. Therefore, it is not necessary to forcibly perform a lane change to the traveling lane L2, the process advances to S14, and output of an autonomous lane change request appropriate to the travel status is enabled.

At the timepoint when the process advances to step S11, it is assumed that the host vehicle V has not continuously traveled in the passing lane L1 for at least the second threshold value time when the lane the host vehicle V is currently traveling in is not the passing lane L1 (is the traveling lane L2) as shown by the dashed lines in FIG. 4, even if the time Δt from the timepoint t2 when a lane change was last performed to the current timepoint t1 is equal to or greater than the second threshold value time. In other words, it can be assessed that the lane that has been continuously traveled in for at least the second threshold value time is the traveling lane L2, which is a non-passing lane. Therefore, the process advances to S14 and output of an autonomous lane change request appropriate to the travel status is enabled.

Control Action after Lane Change Execution in First Area

Figure 5:
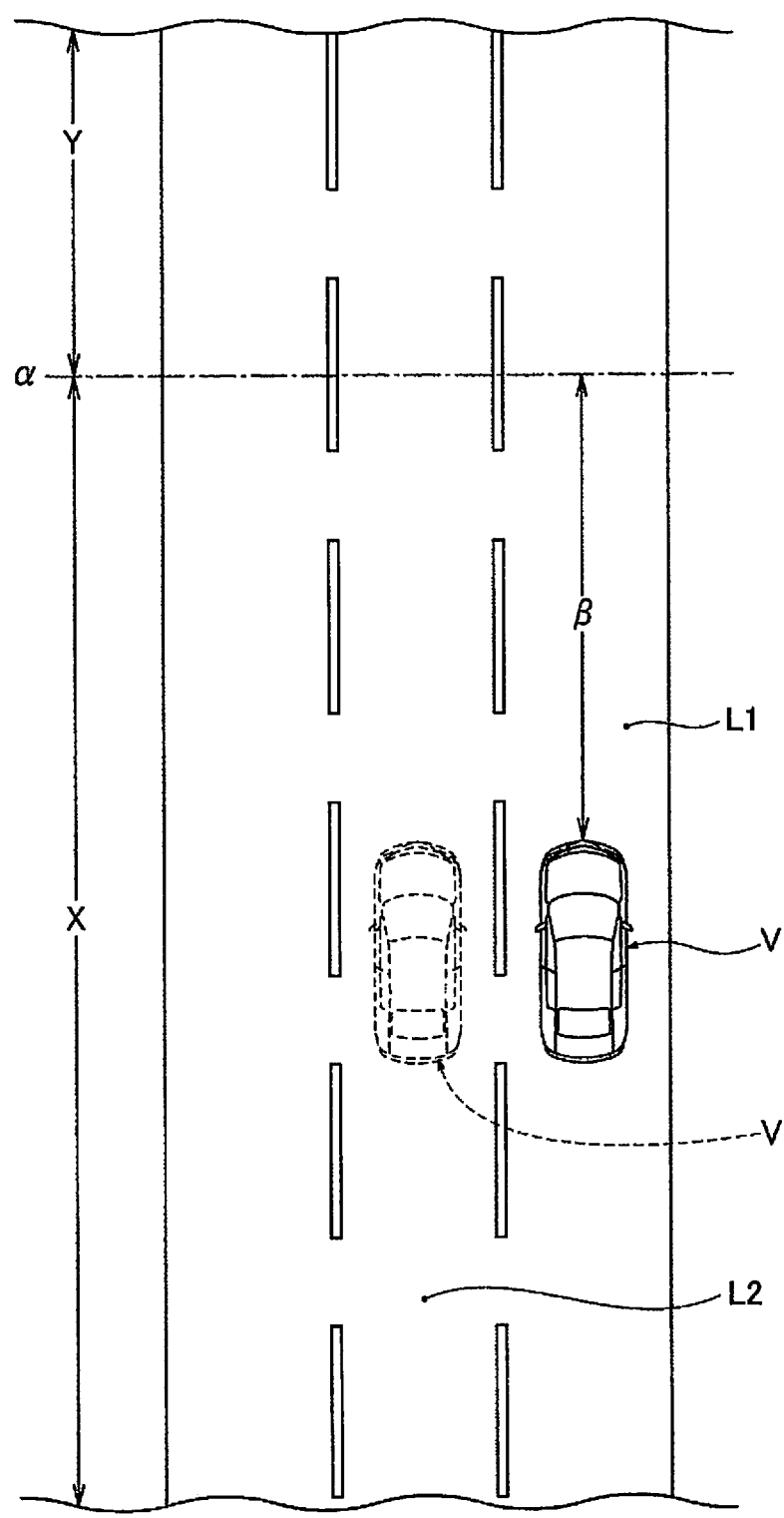
FIG. 5 is an explanatory drawing of a travel state during travel in a first area toward a second area.

A situation is considered in which the host vehicle V is traveling in a first area X toward a second area Y, as shown in FIG. 5. At this time, in the first area X and the second area Y, the road has three lanes, in each of which changing lanes is possible. It is also assumed that the host vehicle V has already executed either a lane change due to the driver's operation or an autonomous lane change while traveling in the first area X.

Therefore, in the flowchart shown in FIG. 3, the process advances in the order of step S1, step S2, step S3, and step S4, and an determination is made as to whether or not a distance β from the center lane B to the area border α immediately ahead is equal to or less than the third threshold value distance, which has been set in advance.

In the scenario shown in FIG. 5, it is assumed that the distance β is equal to or less than the third threshold value distance. In other words, it is assumed that the host vehicle V is comparatively close to the area border α immediately ahead and it has become difficult to freely perform a lane change.

Therefore, the process advances to S5 and a determination is made as to whether or not the host vehicle V is traveling in a traveling lane L2. In the scenario shown in FIG. 5, the host vehicle V is traveling in the passing lane L1. Thus, the process advances to S7, and a determination is made as to whether or not the distance β from the host vehicle V to the area border α immediately ahead is equal to or less than the first threshold value distance, which has been set in advance.

In the scenario shown in FIG. 5, it is assumed that the distance β is equal to or less than the first threshold value distance. In other words, it is assumed that the host vehicle V has come fairly close to the area border α immediately ahead and it would be difficult to perform a lane change multiple times. Therefore, the process advances to S8, an determination is made as to whether or not the host vehicle V is traveling in the passing lane L1, the process advances to S9 in the scenario shown in FIG. 5 in which the host vehicle V is traveling in the passing lane L1, and a request for an autonomous lane change toward the traveling lane (the non-passing lane) L2 is outputted. Upon determining that an autonomous lane change can be executed, the target travel roadway is set to the traveling lane L2, and an autonomous lane change toward the traveling lane L2 is executed.

It is thereby possible to cause the host vehicle V to travel in the traveling lane L2 in advance before entering the second area Y. Therefore, after the host vehicle V has entered the second area Y where an autonomous lane change cannot be executed, travel in the passing lane L1 can be prevented from continuing for longer than anticipated. It is then possible to reduce the burden imposed on the driver in terms of, for example, observing whether the host vehicle V has been traveling in the passing lane L1 for longer than a time established by law.

In the process of step S4, an determination is made as to whether or not the distance β is equal to or less than the third threshold value distance, and after advancing to step S5, the process advances to S6 when the host vehicle V is traveling in the traveling lane L2 as shown by the dashed lines in FIG. 5.

In the process of step S7, an determination is made as to whether or not the distance β is equal to or less than the first threshold value distance, and after advancing to step S8, the process advances to S10 when the host vehicle V is traveling as shown by the dashed lines in FIG. 5.

An autonomous lane change toward the passing lane L1 is thereby prohibited in any situation. In other words, even if, for example, a passing condition is fulfilled in accordance with a relative speed and/or a relative distance with a preceding vehicle, a request for an autonomous lane change toward the passing lane L1 is not outputted and travel in the traveling lane L2 is maintained. A lane change due to the driver's operation is not prohibited even if the lane change is toward the passing lane L1. Consequently, the occurrences of an autonomous lane change returning to the traveling lane can be prevented, and occurrences of autonomous lane changes can be minimized to prevent uncomfortable sensations for the driver.

When the distance β is longer than the third threshold value distance, a sufficient distance β from the host vehicle V to the area border is ensured and it can be assessed that a lane change can be freely performed. Therefore, the process advances from step S4 to step S14 and output of an autonomous lane change request appropriate to the travel status is enabled.

Furthermore, even if the distance β is equal to or less than the third threshold value distance, when the host vehicle V is traveling in the passing lane L1 and the distance) β is longer than the first threshold value distance, the process advances from step S7 to step S14 and output of an autonomous lane change request appropriate to the travel status is enabled. Specifically, in this case, an autonomous lane change toward the passing lane cannot be prohibited because the host vehicle V is already traveling in the passing lane L1. The distance to the area border α remains sufficient for a lane change due to the driver's operation to be executed after an autonomous lane change is executed, and should an autonomous lane change toward the traveling lane be performed unnecessarily, it would be possible for the driver to perform a lane change to the passing lane of their own volition. In this situation, it is anticipated that an autonomous lane change back toward the traveling lane would need to be executed, and there is a risk that lane changes would be executed continuously. Therefore, even if the distance β is equal to or less than the third threshold value distance, when the host vehicle V is traveling in the passing lane L1 and the distance β is longer than the first threshold value distance, output of an autonomous lane change request appropriate to the travel status is enabled, whereby needless lane change executions can be minimized.

Next, effects shall be described. In the driving assist method and the driving assist device of the first embodiment, the effects enumerated below can be achieved.

(1) A driving assist method (FIG. 3) carried out by a controller (lane change controller 40) that generates a target travel route and executes a lane change assist in which a lane change made by a host vehicle V is assisted on the basis of the target travel route, the driving assist method configured such that when an area where an autonomous lane change can be executed is designated as a first area X, an area where the autonomous lane change cannot be executed is designated as a second area Y, and a boundary between the first area X and the second area Y is designated as an area border α, determining whether or not the host vehicle V is traveling in a road which has a plurality of lanes and in which a lane change can be made (step S1), determining whether or not the host vehicle V is traveling in the first area (step S2) upon determining that the host vehicle V is traveling in such a road, determining whether or not the host vehicle V is traveling in a predetermined range from the area border α (step S4, step S7, step S11) upon determining that the host vehicle V is traveling in the first area X, and performing a control for the lane change assist (an autonomous lane change) so that the host vehicle V travels in a non-passing lane (a traveling lane L2) (step S6, step S9, step S10, step S13) upon determining that the host vehicle V is traveling in a predetermined range from the area border α.

Travel in the passing lane L1 can thereby be prevented from continuing for longer than anticipated.

(2) The driving assist method is configured such that: upon determining that the host vehicle V is traveling in the first area X, determining whether or not a first position index value (a distance β) from the host vehicle V to an area border α immediately ahead is equal to or less than a first threshold value (a first threshold value distance) (step S7);

a determination is made as to whether or not the host vehicle V is traveling in a passing lane L1 (step S8) upon determining that the first position index value (the distance β) is equal to or less than the first threshold value (the first threshold value distance); and performing the lane change assist (an autonomous lane change) to the non-passing lane (the traveling lane L2) (step S9) upon determining that the host vehicle V is traveling in the passing lane L1.

Due to this configuration, the host vehicle V can be caused in advance to travel in a traveling lane before entering the second area Y, and when the host vehicle V has entered the map data storage part 2 where an autonomous lane change cannot be executed, travel in the passing lane L1 can be prevented from continuing for longer than anticipated.

(3) The driving assist method is configured such that: upon determining that the host vehicle V is traveling in the first area X, determining whether or not a lane change has been executed in the first area X (step S3);

determining whether or not a second position index value (a time Δt), which is a value from a timepoint t2 at which the host vehicle V last made a lane change to a current timepoint t1, is equal to or greater than a second threshold value (a second threshold value time) (step S11) upon determining that a lane change has not been executed in the first area X;

determining whether or not the host vehicle V is traveling in the passing lane L1 (step S12) upon determining that the second position index value (time Δt) is equal to or greater than the second threshold value (the second threshold value time); and upon determining that the host vehicle V is traveling in the passing lane L1, assistance for a lane change (an autonomous lane change) to the non-passing lane (the traveling lane L2) is performed (step S13).

Due to this configuration, when the host vehicle V enters the first area X from the second area Y, the host vehicle V can be quickly moved to the traveling lane L2 without needlessly continuing to travel in the passing lane L1, and travel in the passing lane L1 can be prevented from continuing for longer than anticipated.

(4) The driving assist method is configured such that: upon determining that the host vehicle V is traveling in the first area X, determining whether or not a first position index value (a distance β) from the host vehicle V to an area border immediately ahead is equal to or less than a third threshold value (a third threshold value distance) (step S4);

determining whether or not the host vehicle V is traveling in the non-passing lane (the traveling lane L2) (step S5) upon determining that the first position index value (the distance β) is equal to or less than the third threshold value (the third threshold value distance); and prohibiting the lane change assist (an autonomous lane change) to the passing lane L1 is (step S6, step S10) upon determining that the host vehicle V is traveling in the non-passing lane (the traveling lane L2).

Due to this configuration, the likelihood of a lane change before entering the second area Y is minimized, and the occurrence of a lane change can be prevented while preventing travel in the passing lane L1 from continuing for longer than anticipated.

(5) A driving assist device comprising a controller (a lane change controller 40) that generates a target travel route and executes a lane change assist in which a lane change made by a host vehicle V is assisted on the basis of the target travel route, the driving assist device configured such that when an area where an autonomous lane change can be executed is designated as a first area X, an area where the autonomous lane change cannot be executed is designated as a second area Y, and a boundary between the first area X and the second area Y is designated as an area border α, the controller (the lane change controller 40) includes:

a road determination part 41 that determines whether or not the host vehicle V is traveling in a road which has a plurality of lanes and in which a lane change can be made;

an area determination part 42 that determines whether or not the host vehicle V is traveling in the first area X upon determining by the road determination part 41 that the host vehicle V is traveling in such a road;

a travel location determination part 43 that determines whether or not the host vehicle V is traveling in a predetermined range from the area border α upon determining by the area determination part 42 that the host vehicle V is traveling in the first area X; and a lane change control part 44 that controls the lane change assist (an autonomous lane change) so that the host vehicle travels in a non-passing lane (a traveling lane L2) upon determining by the travel location determination part 43 that the host vehicle V is traveling in a predetermined range from the area border α.

Due to this configuration, travel in the passing lane L1 can be prevented from continuing for longer than anticipated.

The driving assist method and the driving assist device of the present disclosure were described above on the basis of the first embodiment, but the first embodiment is not provided by way of limitation on the specific configuration; changes, additions, etc., to the design are allowed as long as there is no deviation from the scope of the invention as in the claims.

In the first embodiment, an example was presented in which the lane change assist performed by the lane change controller 40 is an autonomous lane change. However, an autonomous lane change is not a limitation on "a lane change assist." For example, the target lane can be displayed on the display device 6, or lane change guidance corresponding to the target travel route can be provided in a form such as giving notification of a lane change through a voice, merely prompting a lane change. Even in this situation, it is possible to prompt a move to the traveling lane L2 before entering the second area where an autonomous lane change cannot be executed, or to prompt a rapid move to the traveling lane L2 after entering the first area X from the second area Y. It is thereby possible to prevent continuous travel in a passing lane for longer than anticipated. When lane change guidance is provided as the lane change assist, the drive-assisted vehicle does not need to be an autonomously driven vehicle.

In the first embodiment, an example was presented in which the first area where the autonomous lane change can be executed and the second area where the autonomous lane change cannot be executed are identified on the basis of whether or not the area is one where high-precision three-dimensional map data is maintained. However, the area can be assessed to be a "first area" provided that the area is one where host vehicle position information and lane information needed for an autonomous lane change execution can both be acquired. In other words, the first area and the second area can be identified on the basis of not only the presence/absence of high-precision three-dimensional map data, but also whether or not the area is one where lane information can be acquired with a high degree of precision by, for example, the onboard sensor 1, etc.

In the first embodiment, when a request for an autonomous lane change toward the traveling lane is outputted, the driver can be notified that an autonomous lane change will be executed in order to not continue traveling in the passing lane. Thus, the driver can ascertain the significance of the autonomous lane change being executed, and a lane change toward the passing lane made of the driver's volition can be prevented from being executed. Even when an autonomous lane change toward the passing lane is prohibited, a notification is issued indicating that the autonomous lane change execution is prohibited in order to not continue traveling in the passing lane, and the driver can thereby ascertain the purpose of the control.

In the first embodiment, an example was presented in which the distance β is used as the first position index value from the host vehicle V to the immediate area border α. However, the first position index value need only be a value whereby a positional relationship between the host vehicle V and the immediate area border α can be ascertained. Therefore, an arrival time at the area border α, which is determined by, for example, dividing the distance β from the host vehicle V to the immediate area border α by a travel speed, may be used as the first position index value. In this situation, the values of the first threshold value and the third threshold value can be changed in accordance with the travel speed.

In the first embodiment, an example was presented in which the time from the timepoint at which a lane change was last performed to the current timepoint is used as the second position index value from the timepoint at which the host vehicle V last performed a lane change to the current timepoint. However, the second position index value need only be a value whereby a positional relationship between the position where a lane change was last performed, and the current host vehicle position can be ascertained. Therefore, for example, a distance from the position where a lane change was last performed to the current host vehicle position may be used as the second position index value.

The invention claimed is:

1. A driving assist method performed by a controller that generates a target travel route and that executes a lane change assist in which a lane change made by a host vehicle is assisted based on the target travel route, the driving assist method comprising:
when an area where information needed for an execution of an autonomous lane change can be acquired is designated as a first area, an area where information needed for the execution of the autonomous lane change cannot be acquired is designated as a second area, and a boundary between the first area and the second area is designated as an area border,
determining whether or not the host vehicle is traveling in a road which has a plurality of lanes and in which a lane change can be made;
determining whether or not the host vehicle is traveling in the first area upon determining that the host vehicle is traveling in the road;
determining whether or not the host vehicle is traveling in a predetermined range from the area border upon determining that the host vehicle is traveling in the first area; and
performing a control for the lane change assist so that the host vehicle travels in a non-passing lane upon determining that the host vehicle is traveling in a predetermined range from the area border.

2. The driving assist method according to claim 1, further comprising
determining whether or not a first position index value from the host vehicle to an area border immediately ahead is equal to or less than a first threshold value upon determining that the host vehicle is traveling in the first area;
determining whether or not the host vehicle is traveling in a passing lane upon determining that the first position index value is equal to or less than the first threshold value; and
performing the lane change assist for a lane change to the non-passing lane upon determining that the host vehicle is traveling in the passing lane.

3. The driving assist method according to claim 1, further comprising
determining whether or not a lane change has been executed in the first area upon determining that the host vehicle is traveling in the first area;
determining whether or not a second position index value, which is a value from a location at which the host vehicle last made a lane change to the host vehicle, is equal to or greater than a second threshold value upon determining that a lane change has not been executed in the first area;
determining whether or not the host vehicle is traveling in the passing lane upon determining that the second position index value is equal to or greater than the second threshold value; and
performing the lane change assist for a lane change to the non-passing lane upon determining that the host vehicle is traveling in the passing lane.

4. The driving assist method according to claim 1, further comprising
determining whether or not a first position index value from the host vehicle to an area border immediately ahead is equal to or less than a third threshold value upon determining that the host vehicle is traveling in the first area;
determining whether or not the host vehicle is traveling in the non-passing lane upon determining that the first position index value is equal to or less than the third threshold value; and
prohibiting the lane change assist for a lane change to the passing lane upon determining that the host vehicle is traveling in the non-passing lane.

5. A driving assist device comprising a controller that generates a target travel route and executes lane change assistance in which a lane change made by a host vehicle is assisted on the basis of the target travel route, the driving assist device characterized in that
when an area where information needed for an execution of an autonomous lane change can be acquired is designated as a first area, an area where information needed for the execution of the autonomous lane change cannot be acquired is designated as a second area, and a boundary between the first area and the second area is designated as an area border,
the controller includes:

a road determination part that determines whether or not the host vehicle is traveling in a road which has a plurality of lanes and in which a lane change can be made;

an area determination part that determines whether or not the host vehicle is traveling in the first area upon determining by the road determination part that the host vehicle is traveling in the road;

a travel location determination part that determines whether or not the host vehicle is traveling in a predetermined range from the area border upon determining by the area determination part that the host vehicle is traveling in the first area; and a lane change control part that controls the lane change assist so that the host vehicle travels in a non-passing lane upon determining by the travel location determination part that the host vehicle is traveling in a predetermined range from the area border.

6. The driving assist method according to claim 1, further comprising specifying the information needed for the execution of the autonomous lane change as lane information and position information of the host vehicle.

7. The driving assist method according to claim 1, further comprising specifying the information needed for the execution of the autonomous lane change as information of high-precision map data.

\* \* \* \* \*